United States Patent [19]
Shawhan

[11] 3,906,471
[45] Sept. 16, 1975

[54] HIGH SIDE METER

[75] Inventor: Elbert N. Shawhan, West Chester, Pa.

[73] Assignee: Sun Oil Company of Pennsylvania, Philadelphia, Pa.

[22] Filed: Sept. 12, 1973

[21] Appl. No.: 396,627

[52] U.S. Cl. .................. 340/200; 33/366; 340/205
[51] Int. Cl.² ........................................ G08C 19/10
[58] Field of Search ....................... 340/200; 33/366

[56] References Cited
UNITED STATES PATENTS

| | | | |
|---|---|---|---|
| 2,711,590 | 6/1955 | Wilcox | 33/366 |
| 3,281,808 | 10/1966 | Church | 340/200 |
| 3,375,716 | 4/1968 | Hersch | 340/200 |
| 3,766,658 | 10/1973 | Shawhan | 33/366 |

*Primary Examiner*—Thomas B. Habecker
*Attorney, Agent, or Firm*—George L. Church; Donald R. Johnson; Frank A. Rechif

[57] ABSTRACT

A capacitive-type inclinometer cell, which rotates with the drill pipe, is located in a wellbore. A capacity transmitter, located downhole near the inclinometer, converts the capacity changes of the inclinometer into a rectangular wave which can be transmitted to the surface. At the surface, an electronic unit converts the rectangular wave into a voltage which can be displayed on a meter calibrated to read degrees.

17 Claims, 9 Drawing Figures

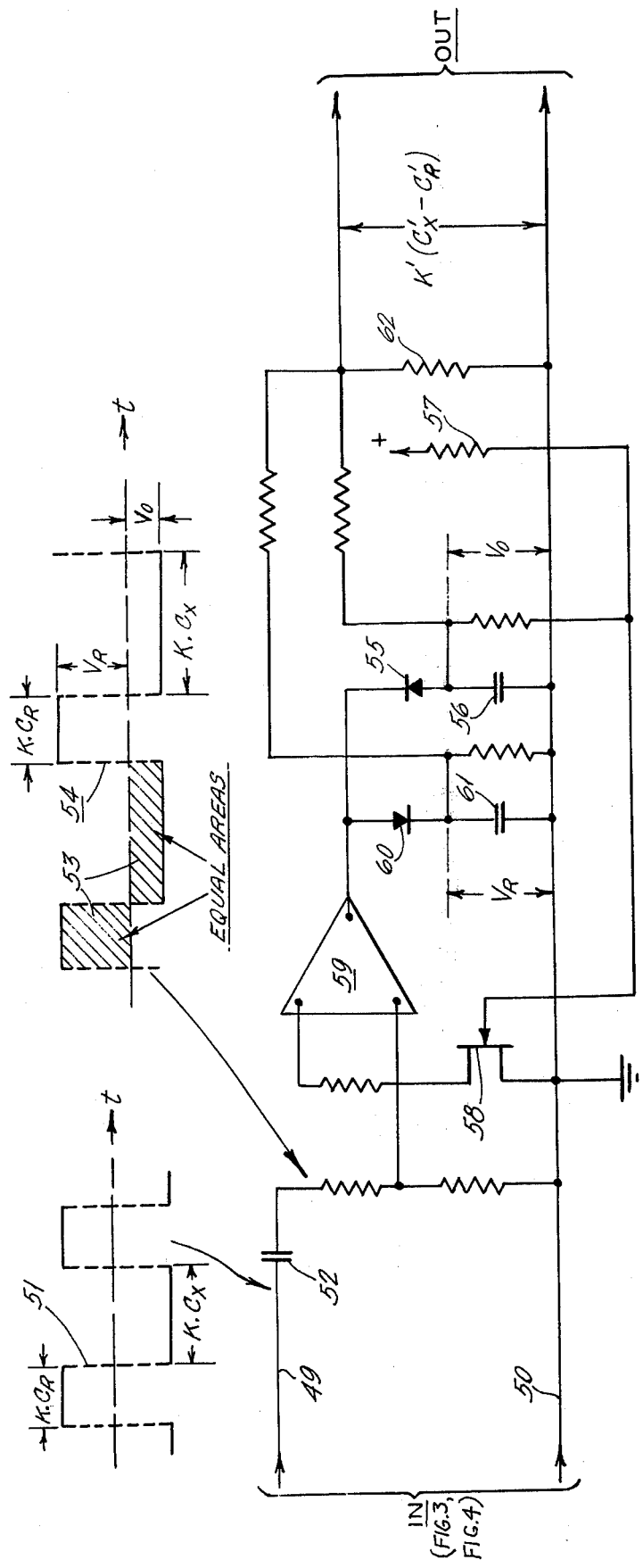

HIGH SIDE METER

This invention relates to a so-called high side meter, which is an instrument for indicating the angle of deviation of a fixed point from the high side of a bent sub used in directional drilling.

In directional drilling, the drill bit is commonly driven by a mud motor mounted at the lower end of the drill string. The rate of deviation from vertical is determined by the angle of a bent sub between the mud motor and the drill string. The upper end of the drill pipe (drill string) is prevented from turning by clamping the rotary table. As the pipe is twisted about its axis by the reaction to the loading on the bit, it is necessary to rotate the upper end of the pipe in the opposite direction, to keep the bent sub in the vertical plane containing the axis of the pipe.

Since the loading on the bit is constantly changing, it is necessary to have an indication of the direction and amount of rotation required at the rotary table to hold the bent sub in a vertical plane, i.e., to keep a fixed point at the top of the bent sub. An instrument which provides such an indication is termed a high side meter.

At the point of downhole measurement, the acceleration peaks due to vibration are extremely high. Parts of mechanical devices are likely to be loosened and damaged by metal fatigue, after prolonged exposure to the vibration. Filament life in any optical system is also reduced by the vibration.

An object of this invention is to provide a novel high side meter.

Another object is to provide a high side meter which is rugged and durable.

A further object is to provide a high side meter avoiding the use of components which might fail under continuous vibration.

A detailed description of the invention follows, taken in conjunction with the accompanying drawings, wherein:

FIG. 7 is a basic circuit diagram of another type of capacity receiver, useful with the transmitter of FIGS. 3–4.

Figure 1:
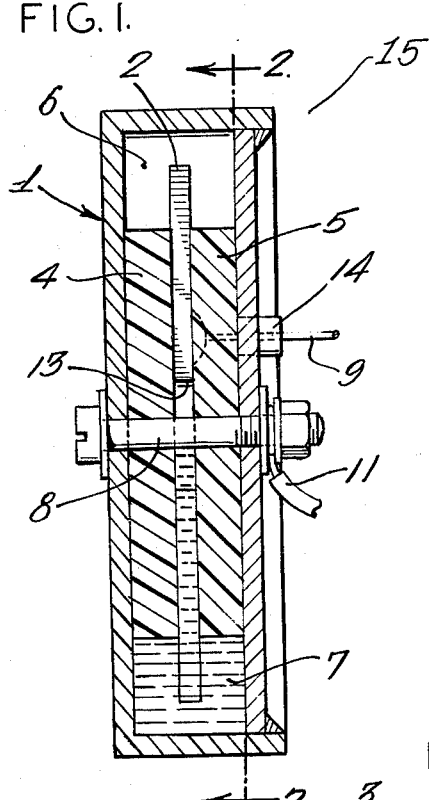
FIG. 1 is a vertical section through an inclinometer sensing cell utilized in the invention.
Figure 2:
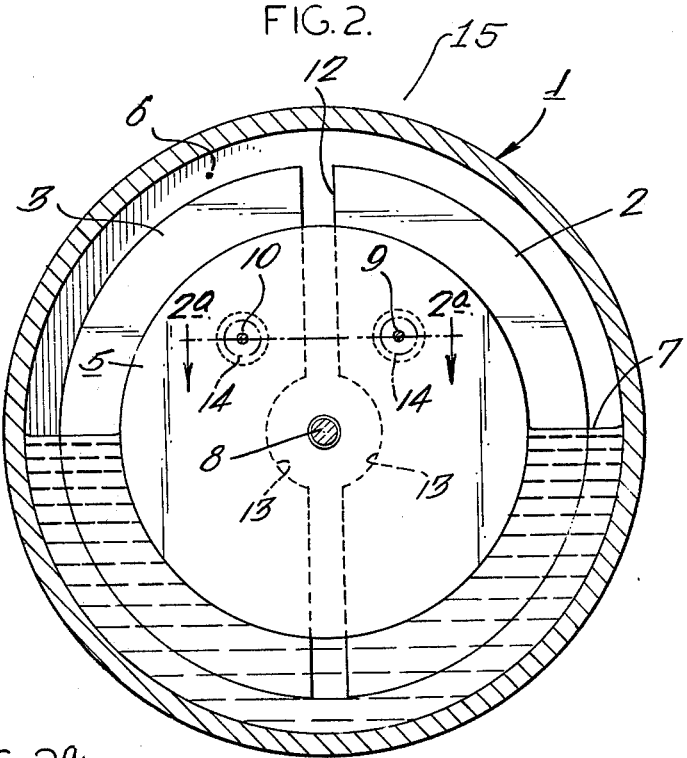
FIG. 2 is a sectional view taken along line 2—2 in FIG. 1.
Figure 2A:
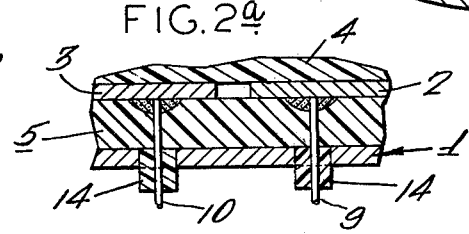
FIG. 2a is a fragmentary transverse section as viewed from the line 2a — 2a in FIG. 2.

Refer now to FIGS. 1 and 2. The inclinometer cell is based upon a liquid pendulum, and utilizes capacity plates for sensing the inclination. A cylindrical sealed housing 1, made of a suitable metal such as brass, has fixedly mounted therein a pair of substantially semi-circular metal plates 2 and 3, these plates being coplanar and being located substantially centrally along the length of the housing cylindrical axis. The plates 2 and 3 are maintained in position in housing 1 and at the same time are electrically insulated from the metal housing, by means of a pair of disks 4 and 5 which are positioned respectively on opposite sides of the plates 2 and 3, between such plates and the respective interior walls of housing 1. Disks 4 and 5 are preferably made of the polytetrafluoroethylene resin known as Teflon.

Disks 4 and 5 have diameters less than that of the housing 1, leaving a circular (i.e., ring-shaped) channel 6, of square cross-section say 3/16 inch by 3/16 inch, in the housing, between the outer cylindrical walls of the disks and the inner cylindrical wall of the housing. The edge portions of the plates 2 and 3 extend into the channel 6, for a radial distance of ⅛ inch, for example.

Channel 6 is half filled with a liquid 7 having a high dielectric constant, such as nitrobenzene. The surfaces of the plates 2 and 3 are roughened (as by sand blasting) to increase the surface tension, by lengthening the line of contact between metal and liquid. The surface tension also prevents splashing, and dampens sudden motion of the liquid caused by shock or vibration.

An axially-located mounting screw 8 provides a convenient mounting arrangement for the inclinometer cell described. The cell is mounted with its axis collinear with or parallel to the pipe axis. As the cell is rotated about its axis with rotation of the pipe, the capacitance between one plate and the housing is increased, while that between the other plate and the housing is decreased. The sum of the capacitances remains constant. For example, a capacitance change of about 15 pf. for each plate may be produced in response to a 180° rotation of the cell about its axis. The inclinometer cell rotates with the pipe, to sense the angle of deviation of a fixed point from the high side. The capacity changes of the inclinometer are transmitted to the surface, as will be subsequently described, and at the surface the angle is indicated on a meter.

It should be noted that the same cell and capacity system as described can be used to measure angle of inclination by mounting the cell with its axis at right angles to the pipe axis.

The surface tension, in combination with the small cross-sectional area of the channel 6, keeps the surface of the liquid 7 normal to the channel, and thus prevents a change in the indicated angle as the cell is tilted about an axis in its plane.

Each of the plates 2 and 3 has a separate electrical lead which is soldered respectively thereto and which extends to the outside of the housing 1 through an insulating grommet 14. Lead 9 is electrically connected to the plate 2 and is insulated from the housing or case 1; lead 10 is electrically connected to the plate 3 and is insulated from the housing 1. To complete the electrical connections to the inclinometer cell, a lead 11 is connected to the central, axial screw 8, and thus also to the (reference) housing or case 1.

In order to electrically isolate the plates 2 and 3 from each other, as well as from housing 1, the plates are formed to leave a space 12 between the adjacent diametral edges of the two plates, and are formed with enlarged semicircular openings 13 at their centers, for ample clearance around the central screw 8.

A capacity transmitter (pulse forming circuit, or pulse generator) is used for converting the capacitance changes of the inclinometer cell into a rectangular wave. If the inclinometer cell is being used as a high side meter, the capacity transmitter would be located downhole, near the inclinometer, and the rectangular wave output of the capacity transmitter would be transmitted to the surface.

Figure 3:
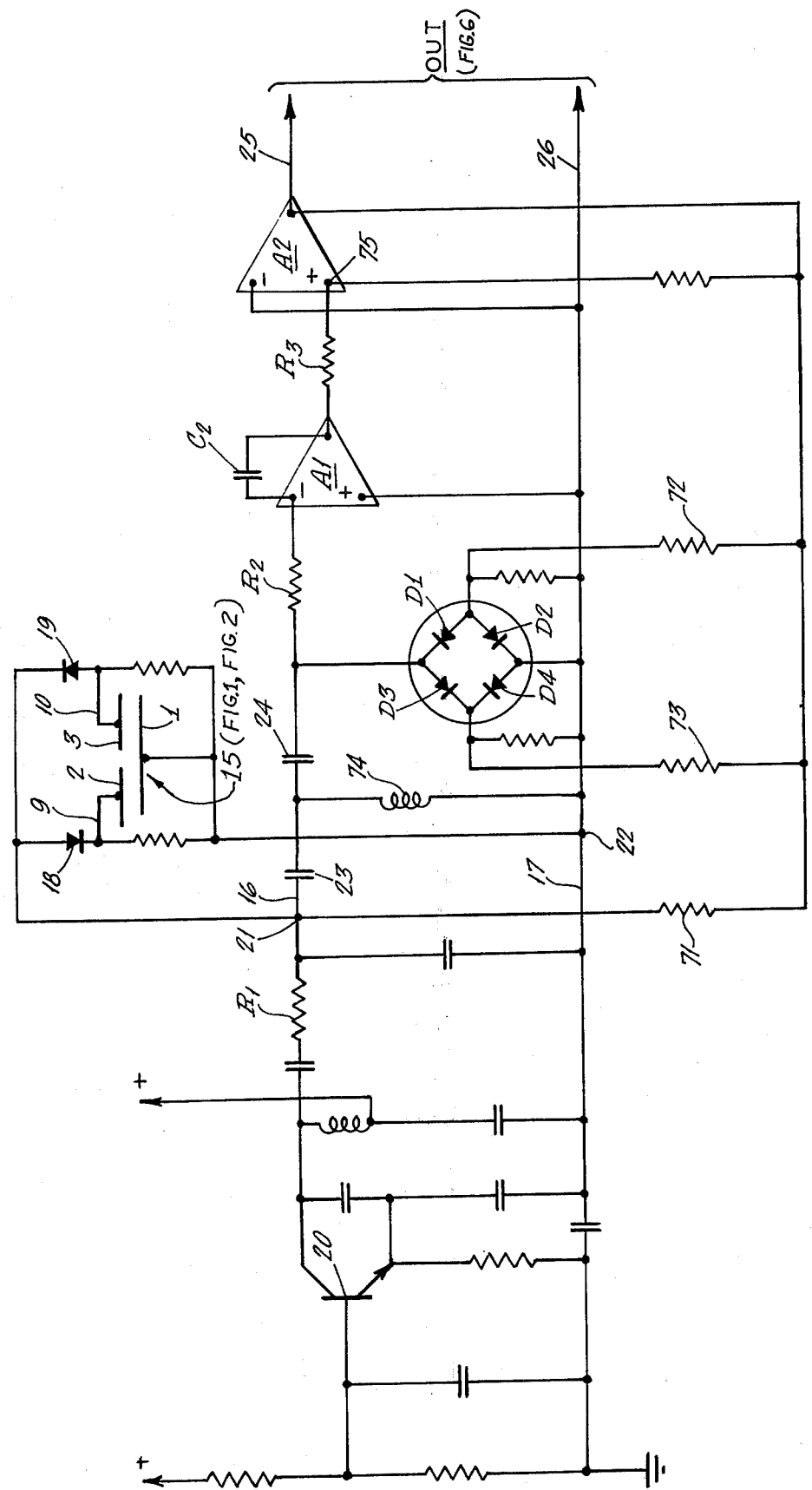
FIG. 3 is a detailed circuit diagram of a capacity transmitter forming a part of a high side meter apparatus.

Now refer to FIG. 3, which is a detailed schematic (circuit diagram) of a capacity transmitter which is utilized in this invention. The inclinometer cell electrode assembly of FIGS. 1–2, denoted generally by numeral 15, is connected between the "hot" output lead 16 and the grounded output lead 17 of an oscillator, through a pair of oppositely-poled switching diodes 18 and 19. That is to say, the capacitance between plate 2 and the grounded housing 1 is connected in series with diode 18, between leads 16 and 17; the capacitance between plate 3 and the grounded housing 1 is connected in series with diode 19, between leads 16 and 17.

The oscillator previously referred to comprises a transistor 20 connected to operate as an oscillator at a frequency of about 100 Khz. The oscillatory voltage output of oscillator 20 is fed through a resistor $R_1$ to a hot oscillator output terminal 21, the corresponding "cold" or "grounded" oscillator output terminal being 22. The switching diode-inclinometer cell electrode arrangement previously described is connected between terminals 21 and 22.

Figure 4:
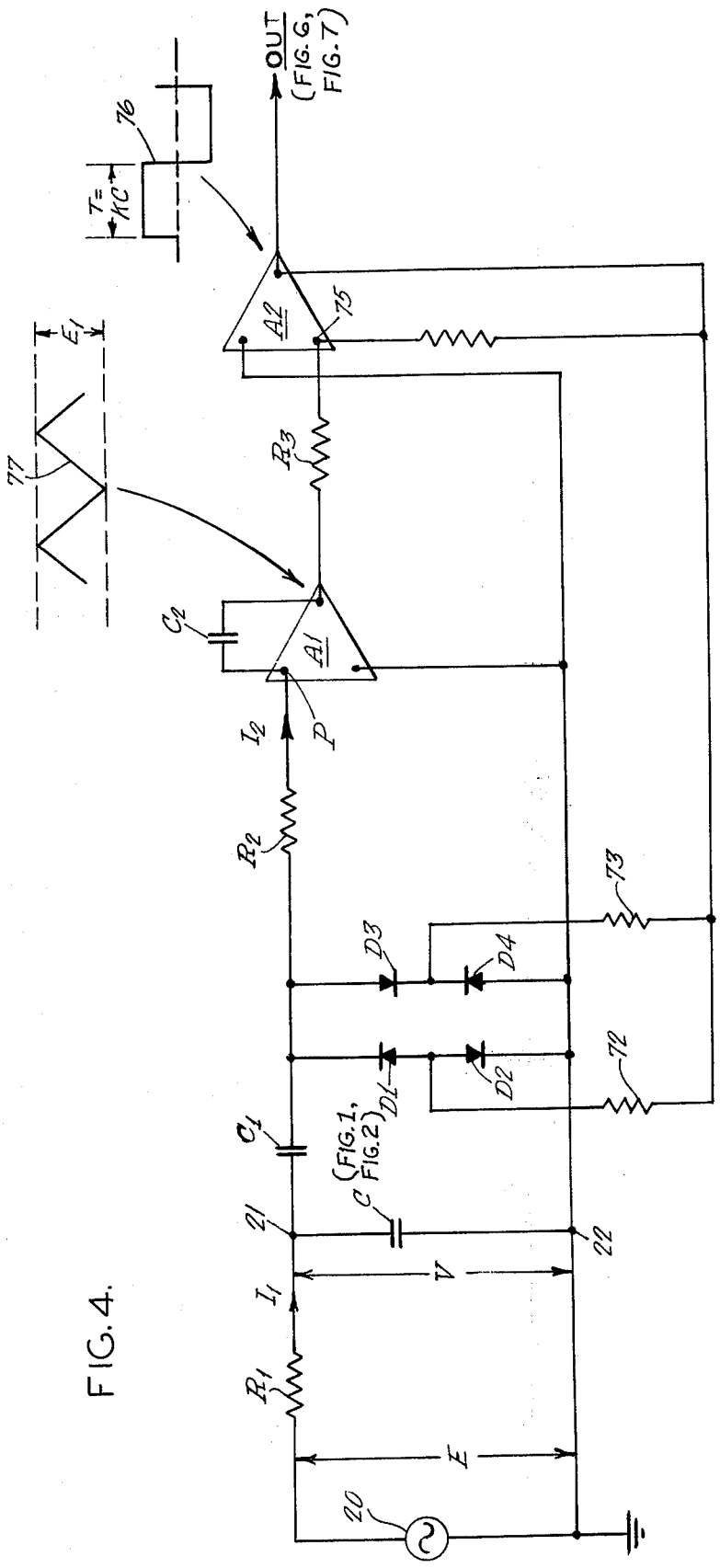
FIG. 4 is a schematic of the basic portion of FIG. 3.

Refer now to FIG. 4, which is the basic portion of the capacity transmitter (pulse generating circuit) shown in complete form in FIG. 3. The capacity transmitter generates a rectangular wave, with the durations of the positive and negative portions of the wave proportional respectively to two individual capacitances. For the high side meter of FIGS. 1–2, the sum of these two capacitances is constant, and one capacity is indicated by a circuit to be later described. The second capacity essentially eliminates the effect of circuit component changes.

In FIG. 4, the output voltage E of oscillator 20 causes a current $I_1$ to flow through $R_1$. Capacitance C, connected across terminals 21 and 22, is the capacitance either of plate 2 (with respect to housing 1) or of plate 3 (also with respect to housing 1).

Using the notation indicated in FIG. 4, $$I_1 = \frac{E}{\sqrt{R_1^2 + \left(\frac{1}{C\omega}\right)^2}} = \frac{EC\omega}{\sqrt{(R_1C\omega)^2 + 1}}$$

If $(R_1C\omega)^2 \gg 1$, $$I_1 = \frac{E}{R_1} \text{ and } V = \frac{I_1}{C\omega} = \frac{E}{R_1C\omega} \quad (1)$$

The diodes $D_1$ or $D_2$, with $C_1$, cause V to be clamped as either a positive or negative voltage. The integrating condenser $C_2$ (in the feedback circuit of operational amplifier A1) is linearly charged over a potential change of $E_1$ in time T. Then, $$\int_0^T I_2 \, dt = C_2 \cdot E_1.$$

Since the operational amplifier A1 requires point P to remain very near ground potential, $$I_2 = \frac{V}{R_2} \text{ and} \int_0^T \frac{V}{R_2} \, dt = C_2 \cdot E_1. \quad (2)$$

From Equations (1) and (2), $$\int_0^T \frac{E}{R_1 R_2 C\omega} \, dt = C_2 E_1, \text{ so}$$

$$\frac{E}{R_1 R_2 C\omega} \cdot T = C_2 E_1 \text{ and } C = \frac{E}{R_1 R_2 \omega E_1} \cdot T$$

or $C = kT$, where $k$ is a constant.

The sawtooth-wave output of amplifier A1 is applied over a resistor $R_3$ to the input of operational amplifier A2.

As previously stated, the circuit of FIG. 3 converts the angular position of the pendulum 15 into the time interval between zero crossings of an electrical rectangular wave signal. The diode switches 18, 19 connect one of the two stator (ungrounded) plates of the inclinometer 15 (each of which plates may be thought of as a sensing capacitor) into the circuit. The voltage across the switched capacitor (which voltage is supplied by the oscillator 20) varies inversely with its capacity.

A switchable diode rectifier, comprising the four diodes D1, D2, D3, and D4 connected as illustrated, rectifies the signal and passes direct current to the amplifier A1 (which operates as an integrator due to condenser $C_2$ connected from its output back to its input).

The diodes 18, 19 are switched by the output voltage of amplifier A2, by way of a connection including a resistor 71. The switchable rectifier D1–D4 is switched between diodes of opposite sense, to reverse the polarity of the rectified voltage supplied to the integrator; the switching voltage for this is also obtained from the output of amplifier A2, through a resistor 72 which is connected to the common junction of diodes D1 and D2, and through a resistor 73 which is connected to the common junction of diodes D3 and D4.

The integrator output is a triangular wave (as illustrated at 77, FIG. 4), reversing as the input polarity is reversed. As the input 75 of amplifier A2 passes through zero potential, the output of amplifier A2 is reversed. The high gain of amplifier A2 causes its output to switch between positive and negative saturation voltages, as indicated by the waveform 76, FIG. 4 (see also FIG. 5).

When the output of amplifier A2 reverses to the opposite saturation voltage, the diode switches 18, 19 and D1–D4 are reversed, and the integrator A1 output (waveform 77) increases in the opposite polarity, due to integration of voltage from the second sensing capacitor (2, or 3) until the output of amplifier A2 is again reversed.

The result is a rectangular wave output 76 from amplifier A2 with time intervals between successive zero crossings ($T_1$ and $T_2$, FIG. 5) that are proportional to the two sensing capacitors while the interval between crossings of the same sense ($T_1$ plus $T_2$, FIG. 5) remains constant. The capacities in turn are proportional to the angular displacement of the pendulum 15.

To summarize the above in a somewhat more general fashion (not specifically limited to a high side meter), as the integrator A1, $C_2$ reaches its limits the output of amplifier A2 reverses polarity. This rectangular-wave voltage can be used to switch capacity C (FIG. 4) between $C_x$, the value to be measured, and $C_R$, a fixed reference. The output of the FIG. 4 circuit then becomes the rectangular wave of FIG. 5.

Generally, the same reference numerals are used for the same circuit components in FIGS. 3 and 4. In FIG. 3, the capacitors 23 and 24, series-connected, together correspond to the capacitor $C_1$ in FIG. 4. Capacitor 23, with the coil 74, forms a filter to reject the switching voltage.

Figure 5:
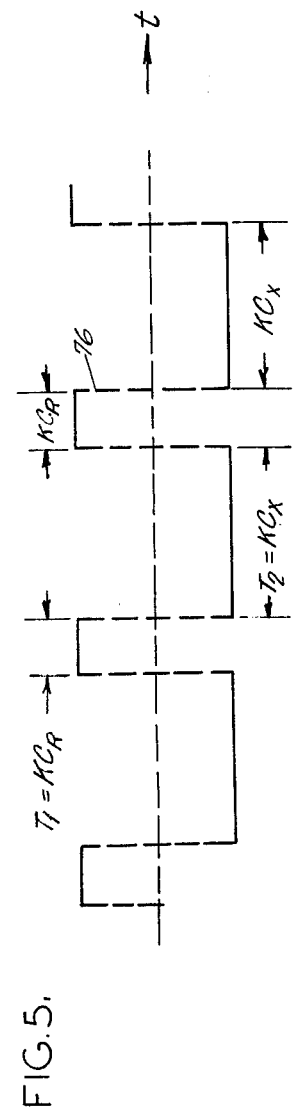
FIG. 5 is a waveform diagram useful in explaining the invention.

The rectangular wave 76 of FIG. 5 appears at the output of the FIG. 3 circuit, which is to say between the two "Out" leads 25 and 26 (lead 26 being grounded) connected to the output of amplifier A2. As previously mentioned, the durations of the positive and negative portions of the rectangular wave are proportional each to a respective one of the two capacitances 2,1 and 3,1.

The waveform 76 of FIG. 5 can be used as a modulating signal, for frequency modulating (frequency-shift-keying) an acoustic carrier, which is then transmitted along the drillpipe from downhole to the surface, in accordance with the teachings of my copending application, Ser. No. 390,833, filed Aug. 23, 1973. (It was stated hereinabove that the capacity transmitter would be located downhole, near the inclinometer cell of FIGS. 1–2).

Figure 6:
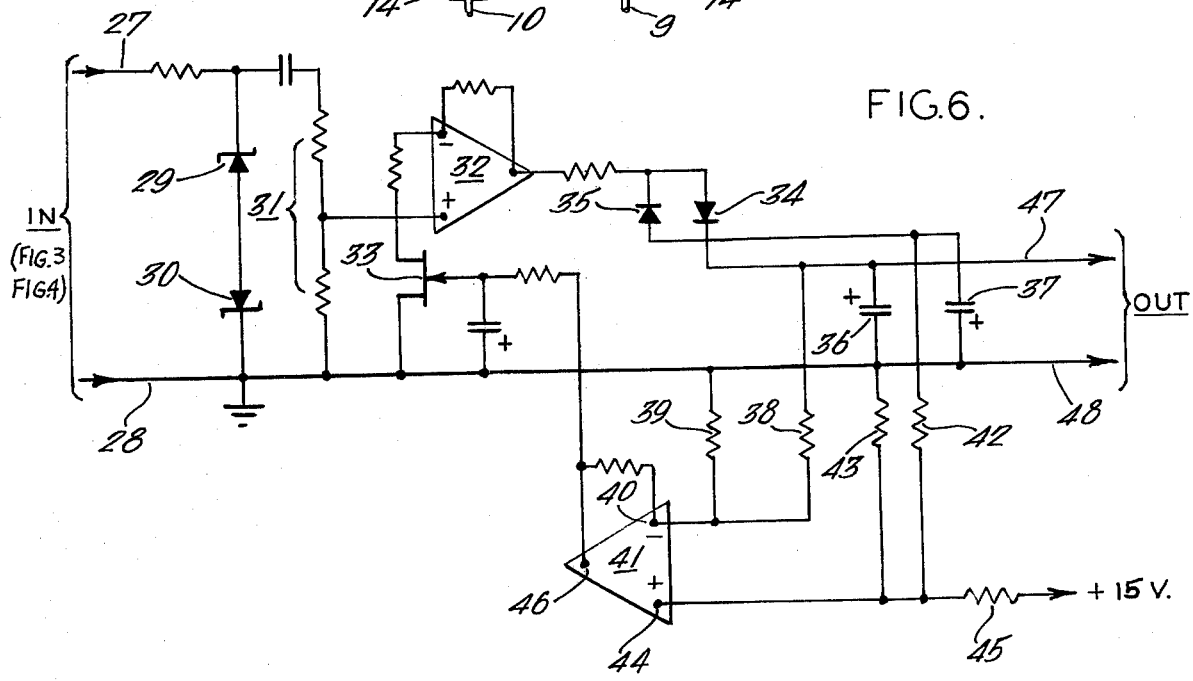
FIG. 6 is a circuit diagram of a capacity receiver forming a part of a high side meter apparatus.

Alternatively, the waveform 76 of FIG. 5 can be transmitted from downhole to the surface by means of a wire line. The waveform of FIG. 5 can be transmitted long distances over ordinary wires. Accuracy depends on measurement of the time intervals $I_1$ and $I_2$. $T_2/T_1 = C_x/C_R$, independent of $k$, where $C_x$ is the value of a capacitance to be measured and $C_R$ is the value of a reference capacitance. For the high side meter being described, the sum of these two capacitances (the capacitances 2, 1 and 3,1 in FIG. 3) is constant, and one capacitance is indicated by the circuit of FIG. 6, now to be described. The capacity receiver of FIG. 6, at the surface, converts the received rectangular wave train into a voltage which can be displayed on a meter calibrated to read degrees.

In the capacity receiver circuit of FIG. 6, stabilization depends on the constant sum of the two capacities. The wave shape transmitted from the output of FIG. 3 (to wit, a rectangular wave, with the durations of its positive and negative portions each proportional to a respective one of the two capacities) appears on the "In" leads 27 and 28 (lead 28 being grounded), and is clipped by the Zener diodes 29 and 30 (connected back-to-back, essentially between leads 27 and 28) to remove any rounding caused by capacity in the transmission medium (between the output of the FIG. 3 transmitter and the input of the FIG. 6 receiver). The amplitude is divided by a voltage divider 31 to a level that permits control of the gain of the operational amplifier 32 (the non-inverting input of which is connected to the "division" point of the divider 31) by a field-effect-transistor (FET) 33 connected as a resistor in the amplifier feedback loop.

The output of amplifier 32 is separated into positive and negative pulses by means of the oppositely-poled diodes 34 and 35 which are connected in parallel to the amplifier output. The separated pulses are clamped on a pair of large condensers 36 and 37; condenser 36 is connected between diode 34 and ground, and condenser 37 is connected between diode 35 and ground. When the separated pulses are clamped at their peak values, the resulting unidirectional voltage is a measure of the time duration of the corresponding negative (or positive) portion of the original rectangular wave, and hence of the corresponding capacity, as explained later. These voltages are added (by means of the series-connected resistors 38 and 39 connected between condenser 36 and ground, the junction point of these two resistors being connected to the inverting input 40 of an operational amplifier 41; and by means of the series-connected resistors 42 and 43 connected between condenser 37 and ground, the junction point of these two resistors being connected to the non-inverting input 44 of amplifier 41) to produce a negative voltage at the output of operational amplifier 41.

With the addition of a positive bias voltage (supplied over a resistor 45 to terminal 44), the sum (of the two voltages which are added as aforesaid) adjusts the gate voltage on the FET gain control 33 (the FET gate being connected to the output 46 of amplifier 41) to maintain a constant sum of the two integrated voltages. This sum is determined by the resultant bias applied to amplifier 32, and is essentially independent of changes in circuit components.

The Out leads 47 and 48 (lead 48 being grounded) feed one of the integrated voltages (that across condenser 36) to a voltmeter (not shown). This voltmeter, across the integrated voltage, can be calibrated to read angle of tilt, in degrees. With the proper voltage divider, a 3½ digit voltmeter can read zero to 1.800 in increments of 0.001 volt, corresponding to 180° of rotation.

As previously indicated, the capacity system of the invention (not including the inclinometer cell of FIGS. 1–2, but including the pulse forming circuit or transmitter of FIGS. 3–4) may be used with a fixed reference capacity. If one capacity is a fixed reference, the capacity of the unknown is read through the capacity receiver circuit of FIGS. 7–8, the basic capacity read-out circuit being illustrated in FIG. 7 and the detailed circuit being illustrated in FIG. 8.

Refer first to FIG. 7, which is a basic circuit for measuring the ratio of the durations of the positive and negative portions of a rectangular wave. The waveform applied to the input leads 49 and 50 is as illustrated at 51, wherein the durations of the positive and negative portions of the rectangular wave are each proportional to a respective one of the two capacities; as illustrated, the positive duration is proportional to the fixed reference capacity $C_R$, while the negative duration is proportional to the unknown capacity $C_x$.

After passing through the large blocking condenser 52 (one microfarad, for example), the positive and negative areas under the rectangular wave must be equal, as indicated at 53 on waveform 54. The negative pulses out of amplifier 59 pass through a diode 55 and are clamped at peak by means of a large condenser 56, the voltage $V_o$ across which is added to a positive bias voltage (supplied by way of resistor 57) and applied to the FET gain control 58 of operational amplifier 59. In this way, the gain of the amplifier 59 is controlled to hold $V_o$ (the voltage across condenser 56) constant.

The positive pulses out of amplifier 59 pass through a diode 60 and are clamped at peak by means of a large condenser 61 to develop thereacross a voltage $V_R$. For equal areas (waveform 54), $$(k\ C_R)V_R = (k\ C_x)V_o, \text{ and}$$

$$C_x = \frac{C_R}{V_o} \cdot V_R = K\ V_R,$$

where $K$ is a constant (since, as stated, $V_o$ is held constant).

In general, $C_x$ and $C_R$ include a common capacity, $C_o$, which is not switched. If the true values of $C_x$ and $C_R$ are given by $C_x = C_x' + C_o$ and $C_R = C_R' + C_o$, then we have $$(C_x' + C_o) = \frac{C_R' + C_o}{V_o} \cdot V_R \quad (3)$$

The voltages across the condensers 61 and 56 are combined in subtractive fashion by means of a resistor 62. Then, the net output of the FIG. 7 circuit is, from Equation (3), $$V_R - V_o = \frac{V_o}{C_R' + C_o}(C_o + C_x') - V_o, \text{ or}$$

$$\text{Output} = \frac{V_o}{C_R' + C_o} \cdot C_x' - \frac{V_o}{C_R' + C_o} \cdot C_R' = k'\ (C_x' - C_R'). \quad (4)$$

From Equation (4), it may be seen that the output of the FIG. 7 circuit is representative of the difference between the unknown capacity and the fixed reference capacity.

Figure 8:
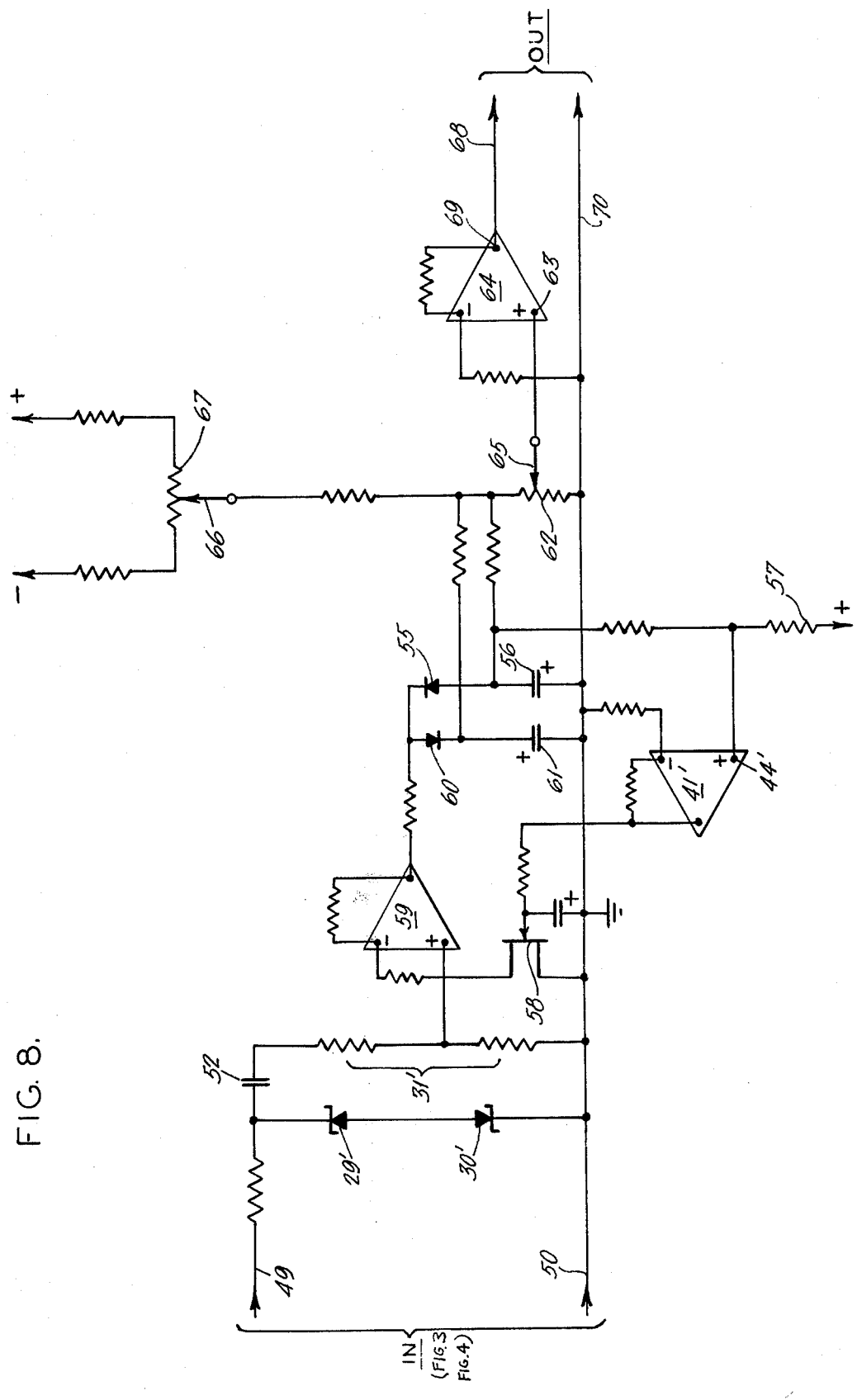
FIG. 8 is a detailed circuit diagram of the receiver of FIG. 7.

Now refer to FIG. 8, which is a detailed schematic of a capacity receiver for reading out an unknown capacity where the other capacity is a fixed reference; the basic portion of this circuit has previously been described, in connection with FIG. 7. In FIG. 8, wherever possible, elements similar to those of FIG. 6 are denoted by the same reference numerals, but carrying prime designations. The waveform 51 which appears on the In leads 49 and 50 is clipped by the Zener diodes 29' and 30', and then divided by the voltage divider 31' before being fed to the input of the operational amplifier 59.

The voltage $V_o$ across condenser 56 is added to a positive bias voltage (supplied through 57) and applied to the input 44' of an operational amplifier 41'; the output of this amplifier is applied to the gate electrode of the FET gain control 58 for amplifier 59, thereby to control the gain of this amplifier to hold the voltage across condenser 56 constant.

The voltages across the condensers 61 and 56 are combined by means of the resistor 62, which in the complete circuit of FIG. 8 is a "span" adjustment potentiometer whose sliding contact 65 is connected to the input 63 of an operational amplifier 64. A "zero" adjustment is provided by connecting the ungrounded end of the potentiometer 62 to the sliding contact 66 of a potentiometer 67 whose ends are connected to potentials of respective opposite polarities. The positive output lead 68 is connected to the output 69 of amplifier 64, and the negative output lead 70 is grounded. The output leads 68, 70 may be connected to a voltmeter.

The invention claimed is:

1. In a telemetering system, an inclination sensing arrangement comprising: a sealed housing; means in the housing providing first and second capacitances; dielectric means in said housing for varying the value of said first capacitance in response to variations in the value of inclination, whereby the value of said first capacitance is representative of the value of said inclination; circuit means for generating a rectangular vave voltage; and circuit means coupling said first and second capacitances to said generating circuit means, for varying the time duration of one polarity of said rectangular wave voltage in proportion to said first capacitance.

2. Telemetering system according to claim 1, including also means receptive of said rectangular voltage wave for generating a voltage representative of the time duration of a preselected one of said portions of said wave.

3. Telemetering system according to claim 1, including also means receptive of said rectangular voltage wave for generating a voltage representative of the difference between the time durations of said negative portion and of said positive portion of said wave.

4. Arrangement defined in claim 1, wherein said dielectric means varies the value of each of said first and second capacitances in response to variations in the value of said physical quantity.

5. Arrangement of claim 4, wherein said first and second capacitances are varied in opposite senses by said dielectric means, thereby to maintain the sum of said first and second capacitances substantially constant.

6. Arrangement defined in claim 1, wherein said dielectric means varies the value of each of said first and second capacitances in response to variations in the value of said physical quantity; said system including also means receptive of said rectangular voltage wave for producing a voltage representative of the time duration of a preselected one of said portions of said wave.

7. Arrangement of claim 6, wherein said first and second capacitances are varied in opposite senses by said dielectric means, thereby to maintain the sum of said first and second capacitances substantially constant.

8. Arrangement defined in claim 1, wherein the capacitance providing means comprises a pair of capacitance plates spaced apart from each other and from the housing and contacting the dielectric means.

9. Arrangement of claim 8, wherein the dielectric means varies the capacitance of each of said plates, relative to the housing, in response to the physical quantity to be measured.

10. Arrangement of claim 9, wherein said first and second capacitances are varied in opposite senses by said dielectric means, thereby to maintain the sum of said first and second capacitances substantially constant.

11. Arrangement defined in claim 1, wherein the providing and varying means comprises a cylindrical metallic housing, a circular channel within said housing and concentric with the axis thereof, a body of a dielectric liquid in said channel forming a liquid pendulum, and a first metallic plate fixedly mounted in and electrically insulated from said housing and extending into said channel into contact with said liquid, whereby rotation of said housing about its axis results in a variation of the capacitance between said plate and said housing.

12. Arrangement recited in claim 11, including also an additional metallic plate fixedly mounted in said housing and electrically insulated from said housing and from said first plate and extending into said channel into contact with said liquid, whereby rotation of said housing about its axis results in a variation of the capacitance between each of said plates and said housing.

13. Arrangement of claim 12, wherein said plates are disposed respectively on opposite sides of said axis, thereby to result in variation of the capacitances in opposite senses upon a rotation of the housing about its axis.

14. System according to claim 13, including also means for producing a voltage representative of the time duration of a preselected one of said portions of said rectangular voltage wave.

15. An inclination sensor, comprising: a container; a dielectric fluid partially filling the container; capacitive plate means in the container positioned perpendicular to a horizontal axis on which inclination is to be sensed, said plate means being positioned in a capacitive relationship with a surface of said container and being shaped to have an amount of surface area in the fluid which varies with said angle; and oscillatory means for generating signals indicative of capacitance of said capacity relationship.

16. Apparatus of claim 15 wherein the plate means comprises two plates, one on each side of the axis and each being a mirror image of the other.

17. Apparatus for sensing an inclination angle, comprising: a container; a dielectric fluid partially filling the container; a capacitive plate arrangement in the container having two plates spaced about and lying in a plane perpendicular to a horizontal axis on which the angle is to be sensed, said plate being positioned with one on each side of said axis and each being a mirror image of the other and said plate arrangement being positioned in a capacitive relationship with the surface of said container; and oscillatory means in communication with the two plates for generating signals indicative of said capacitive relationship of said plates.

* * * * *